(12) United States Patent
Majchrzak

(10) Patent No.: US 8,134,101 B2
(45) Date of Patent: Mar. 13, 2012

(54) FOOD CONTAINER

(75) Inventor: Michael Majchrzak, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 1188 days.

(21) Appl. No.: 11/871,046

(22) Filed: Oct. 11, 2007

(65) Prior Publication Data

US 2009/0095727 A1    Apr. 16, 2009

(51) Int. Cl.
*F24C 15/32* (2006.01)
*A21B 1/26* (2006.01)
*A21B 3/02* (2006.01)

(52) U.S. Cl. .................. 219/400; 99/474; 126/21 A

(58) Field of Classification Search .................. None
See application file for complete search history.

(56) References Cited

U.S. PATENT DOCUMENTS

| | | | |
|---|---|---|---|
| 3,160,153 A * | 12/1964 | Drayer .................. 126/21 A |
| 3,292,525 A | 12/1966 | Jensen | |
| 3,628,447 A | 12/1971 | Levenback | |
| 3,780,794 A | 12/1973 | Staub | |
| 3,942,426 A | 3/1976 | Binks et al. | |
| 4,013,869 A | 3/1977 | Orts | |
| 4,038,968 A | 8/1977 | Rovell | |
| 4,039,776 A | 8/1977 | Roderick | |
| 4,089,322 A | 5/1978 | Guibert | |
| 4,147,924 A | 4/1979 | DeWitt, Jr. | |
| 4,165,620 A | 8/1979 | Gehauf nee Kiesel et al. | |
| 4,281,636 A | 8/1981 | Vegh et al. | |
| 4,377,109 A | 3/1983 | Brown et al. | |
| 4,381,442 A | 4/1983 | Guibert | |
| 4,381,443 A | 4/1983 | Guibert | |
| 4,386,558 A | 6/1983 | Holman et al. | |
| 4,426,923 A | 1/1984 | Ohata | |
| 4,437,396 A | 3/1984 | Plattner et al. | |
| 4,455,478 A * | 6/1984 | Guibert .................. 219/400 |
| 4,617,908 A | 10/1986 | Miller et al. | |
| 4,623,780 A | 11/1986 | Shelton | |
| 4,635,540 A | 1/1987 | Dowds | |
| 4,655,192 A | 4/1987 | Jovanovic | |

(Continued)

FOREIGN PATENT DOCUMENTS

JP    2000-175781 A    6/2000

(Continued)

OTHER PUBLICATIONS

DECO-TECH Air Curtain Cold Pan, May 2002, 2 pages, Revision 2.3, Kevry Corporation, Innovative Design and Fabrication, U.S.A.

(Continued)

*Primary Examiner* — Joseph M Pelham
(74) *Attorney, Agent, or Firm* — Foley & Lardner LLP

(57) ABSTRACT

One embodiment of the disclosure relates to a heated food container including an interior chamber with an upper portion, a lower portion, and a wall defining an opening into the interior chamber. The opening is configured to permit the movement of food into and/or out of the interior chamber. The heated food container further includes a fan configured to supply air to a duct system and a heater configured to heat the air in the duct system. The duct system includes a first air duct configured to direct the heated air across the opening such that the heated air forms a barrier between the interior chamber and an exterior environment and a first bypass duct configured to deliver heated air directly to the lower portion of the interior chamber without being directed across the opening.

25 Claims, 4 Drawing Sheets

U.S. PATENT DOCUMENTS

| | | |
|---|---|---|
| 4,772,268 A | 9/1988 | Bates |
| 4,835,351 A | 5/1989 | Smith et al. |
| 4,876,426 A | 10/1989 | Smith |
| 4,898,319 A * | 2/1990 | Williams ................ 228/219 |
| 4,995,313 A | 2/1991 | Delau et al. |
| 5,039,535 A | 8/1991 | Lang et al. |
| 5,072,666 A | 12/1991 | Hullstrung |
| 5,203,258 A | 4/1993 | Tippmann et al. |
| 5,241,947 A | 9/1993 | Sandolo |
| 5,272,963 A | 12/1993 | Del Fabbro |
| 5,361,684 A | 11/1994 | Cattaneo |
| 5,532,456 A | 7/1996 | Smith et al. |
| 5,715,745 A | 2/1998 | Blanton, Jr. et al. |
| 5,771,789 A | 6/1998 | Davis |
| 5,802,963 A | 9/1998 | Cohn et al. |
| 5,947,012 A | 9/1999 | Ewald et al. |
| 5,992,301 A | 11/1999 | Mukumoto |
| 6,069,344 A | 5/2000 | Krasznai et al. |
| 6,098,527 A | 8/2000 | Chang |
| 6,114,659 A | 9/2000 | Finck et al. |
| 6,250,215 B1 | 6/2001 | Brenn |
| 6,358,548 B1 | 3/2002 | Ewald et al. |
| 6,369,362 B1 * | 4/2002 | Brenn ................ 219/401 |
| 6,454,176 B1 | 9/2002 | Burkett et al. |
| 6,474,222 B1 | 11/2002 | Pretre |
| D480,260 S | 10/2003 | Domi et al. |
| 6,670,585 B2 | 12/2003 | Burkett et al. |
| 6,742,344 B2 * | 6/2004 | Vormedal ................ 62/89 |
| 7,220,946 B2 * | 5/2007 | Majchrzak et al. ........ 219/401 |
| 7,547,862 B2 * | 6/2009 | Kim et al. ................ 219/400 |
| 7,829,823 B2 * | 11/2010 | Nuttall et al. ............ 219/214 |
| 2002/0005686 A1 * | 1/2002 | Nuttall et al. ............ 312/236 |
| 2002/0100752 A1 * | 8/2002 | Brenn ................ 219/401 |
| 2003/0172670 A1 | 9/2003 | Vormedal |
| 2005/0173397 A1 * | 8/2005 | Majchrzak et al. ........ 219/401 |
| 2005/0183715 A1 | 8/2005 | Moreth et al. |
| 2005/0211109 A1 | 9/2005 | Majchrzak et al. |
| 2011/0005409 A1 * | 1/2011 | Majchrzak ................ 99/468 |

FOREIGN PATENT DOCUMENTS

| | | |
|---|---|---|
| JP | 2001269249 A * | 10/2001 |
| WO | WO 00/36958 A1 | 6/2000 |
| WO | WO 2005/073094 A | 8/2005 |

OTHER PUBLICATIONS

Fried Food Holding Station, Model FFHS-27, date unknown, 2 pages, Merco Savory, Fort Wayne, IN.

HPT Heated Pass-Thru, Sep. 2001, 2 pages, Bulletin No. 818-0404, Frymaster, L.L.C., Shreveport, Louisiana.

International Search Report and Written Opinion of International Application No. PCT/US2008/062999, mailing date Feb. 18, 2009, 10 pages.

\* cited by examiner

FOOD CONTAINER

BACKGROUND

The subject matter described herein relates generally to the field of containers. In particular, the subject matter described herein relates to food containers. The food containers may be used for storing food, holding food at a particular temperature, cooling food, humidifying food, rethermalizing food, warming food, and/or cooking food.

A wide variety of food containers are used to house and display food in places such as convenience stores, restaurants, etc. Depending on the type of food, these containers may be heated, cooled, and/or humidified to prevent the food from becoming cold and/or hard, thus making the food more appealing to consumers. For example, the containers may be used to house and display a wide variety of foods such as chicken, hamburgers, hot dogs, etc. In other applications, the containers may be used to hold food at elevated temperature or to cook food.

A solid barrier such as a door may be used to isolate the interior of the container from the exterior environment. The door prevents the transfer of heat and/or humidity between the interior of the container and the exterior environment. The door is usually hinged on one side so that it can be opened and closed to provide access to the interior of the container. Unfortunately, continual opening and closing of the door may result in a loss of productivity and efficiency on the part of the persons using the containers. Users often desire to quickly remove items from the containers. For example, in a fast food setting, a food preparer may want to be able to quickly access food components (e.g., hot dog buns, hot dogs) to prepare the finished food product (e.g., a hot dog in the bun with desired toppings). In other situations, the container may be provided with an opening that does not include a barrier between the exterior environment and the interior of the container. This arrangement results in a loss of efficiency due to excess heating, cooling, and/or humidifying.

To remedy these problems, an air curtain may be used to form a barrier between the exterior environment and the interior of the container. However, in food containers that utilize an air curtain barrier, substantially all of the heated and/or humidified air is first used to form the air curtain before being delivered to the interior of the container. In certain food container configurations, this may lead to undesirable consequences. For example, in some food containers that utilize an air curtain barrier, it may be difficult to maintain the interior of the container at a substantially uniform temperature. This difficulty is particularly apparent as the size, and specifically the height, of the food container is increased. Accordingly, it would be desirable to provide an improved food container for housing items such as food.

It should be understood that the claims define the scope of the subject matter for which protection is sought, regardless of whether any of the aforementioned challenges are overcome by the subject matter covered by the claims. Also, the terms recited in the claims should be given their ordinary and customary meaning as would be recognized by those of skill in the art, except, to the extent a term is used herein in a manner more expansive than its ordinary and customary meaning, the term should be given its ordinary and customary meaning plus the additional expansive meaning, or except if a term has been explicitly defined to have a different meaning by reciting the term followed by the phase "as used herein shall mean" or similar language. Accordingly, the claims are not tied to any particular embodiment, feature, or combination of features other than those explicitly recited in the claims.

SUMMARY

One embodiment relates to a heated food container including an interior chamber with an upper portion and a lower portion. The heated food container further includes a wall defining an opening into the interior chamber The opening is configured to permit the movement of food into and/or out of the interior chamber. The heated food container further includes a fan configured to supply air to a duct system and a heater configured to heat the air in the duct system. The duct system includes a first air duct configured to direct the heated air across the opening such that the heated air forms a barrier between the interior chamber and an exterior environment and a first bypass duct configured to deliver heated air directly to the lower portion of the interior chamber without being directed across the opening.

Another embodiment relates to a heated food container including a chamber having a sidewall defining an interior cavity of the chamber, an opening in the sidewall of the chamber, a first air duct configured to deliver heated air across the opening, and a first bypass duct configured to deliver heated air to the interior cavity. The first bypass duct is configured so that the heated air delivered by the first bypass duct combines with the heated air delivered by the first air duct at a portion of the interior cavity distinct from the location where the first air duct delivers heated air across the opening.

Another embodiment relates to a heated food container including an interior chamber having an upper portion and a lower portion. The heated food container further includes a first wall defining a first opening into the interior chamber and a second wall defining a second opening into the interior chamber. The first opening and the second opening are both configured to permit the movement of food into and/or out of the interior chamber. The heated food container further includes a fan configured to supply air to a duct system and a heater configured to heat the air in the duct system. The duct system includes a first air duct and a second air duct. Both the first air duct and the second air duct are configured to direct the heated air across the first opening and the second opening, respectively, to form a first barrier and a second barrier between the interior chamber and an exterior environment. The duct system further includes a first bypass duct configured to deliver heated air directly to the lower portion of the interior chamber without being directed across either the first or the second opening.

The invention is capable of other embodiments and of being practiced or carried out in various ways. Alternative exemplary embodiments related to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Figure 1:
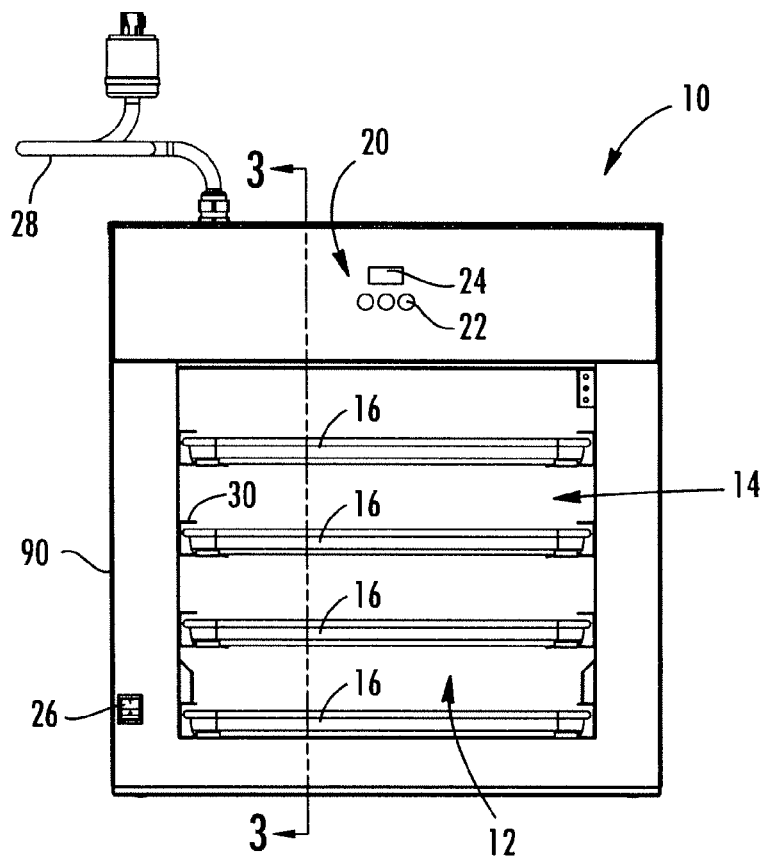
FIG. 1 is a front elevation view of a container according to one embodiment.
Figure 2:
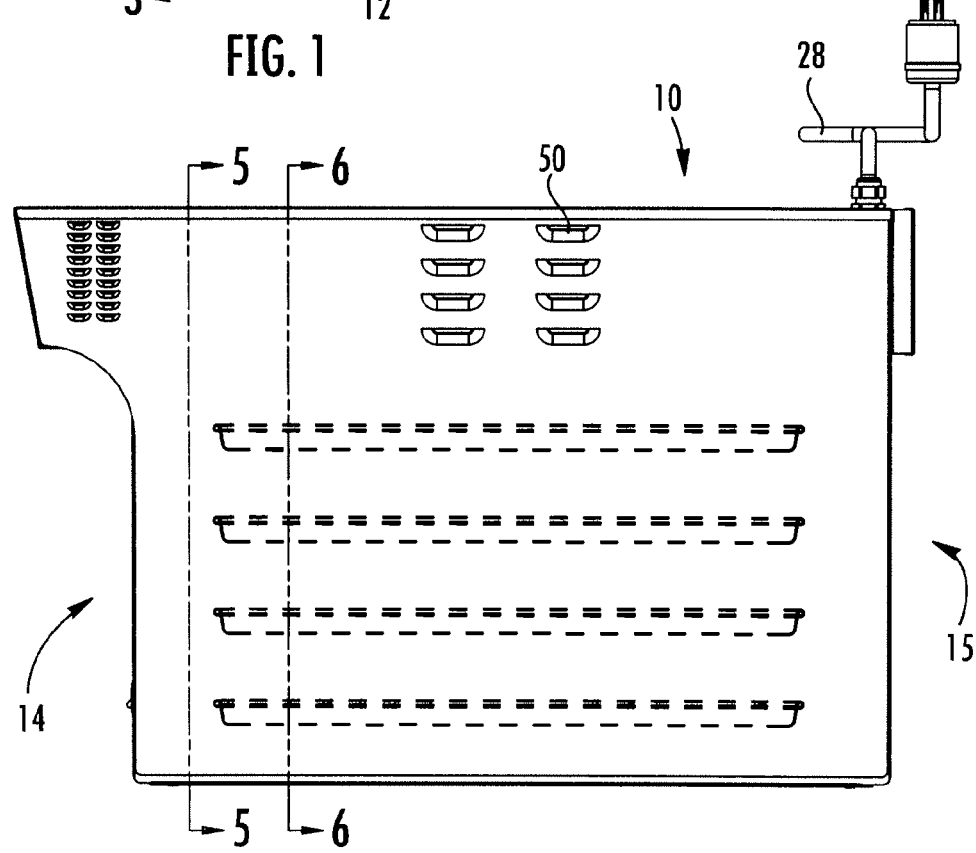
FIG. 2 is a side elevation view of the container of FIG. 1.

Referring in general to FIGS. 1-7 and in particular to FIGS. 1 and 2, a container 10 is shown according to one embodiment. Container 10 includes an interior cavity or chamber 12 configured to house items such as food in a controlled environment. Container 10 is shown in FIGS. 1-7 as having a particular shape, but in other embodiments, container 10 may be any of a number of suitable shapes and configurations. For example, container 10 may be substantially cylindrical, etc. According to various exemplary embodiments, container 10 may be configured to be portable (e.g., moved by hand, rolled on castors, etc.) or fixed in a stationary position using a suitable fastening mechanism (e.g., welding, bolted, glued, etc.). In the embodiment shown in FIGS. 1-7, container 10 is configured to be placed on top of a countertop or table. In another embodiment, an opening may be provided on a top side of container 10. In still another embodiment, container 10 may comprise three or more openings for moving food between the interior and the exterior of container 10. In yet another embodiment, container 10 may include transparent sides (e.g., glass, plastic, etc.) so that interior chamber 12 and items therein are visible.

In one embodiment, container 10 includes a control system, which is used to maintain the physical characteristics (e.g., temperature, humidity, etc.) of the air in interior chamber 12 at set points selected by the user. The control system is typically configured to control both temperature and humidity of the air in interior chamber 12. However, in other embodiments, the control system may be configured to control only one of the temperature and humidity of the air in interior chamber 12 or may be configured to control additional properties of the air in interior chamber 12 such as the flow rate of the air. In general, the control system may include any components, structure, and matter that are used to control the temperature and humidity of the air in container 10. In one embodiment, the control system comprises at least a thermometer and/or a hygrometer. In another embodiment, the control system comprises a thermostat and/or a humidistat which are used to control the temperature and/or humidity, respectively, of the air in interior chamber 12. In still another embodiment, the control system may use feedback control to control the temperature and/or humidity of the air in interior chamber 12.

A control panel 20 may be used to provide input (e.g., set levels for temperature, humidity, water temperature, etc.) to the control system. In one embodiment, as shown in FIG. 1, control panel 20 includes buttons 22 and display 24. Buttons 22 may be used to input the desired temperature and/or humidity level. Display 24 is configured to show the user the set and/or actual temperature and/or humidity levels. In addition, container 10 also includes a power on/off switch 26 and a power cord 28. In other embodiments, control panel 20 may include other input devices and/or displays. For example, control panel 20 may include rotary dials instead of buttons 22. Also, control panel 20 may be distributed on container 10. For example, display 24 may be located on one side of container 10 and buttons 22 may be located on another side of container 10. In yet another embodiment, container 10 may be supplied with a computer interface for interfacing with a computerized control system or a computerized information source.

Figure 3:
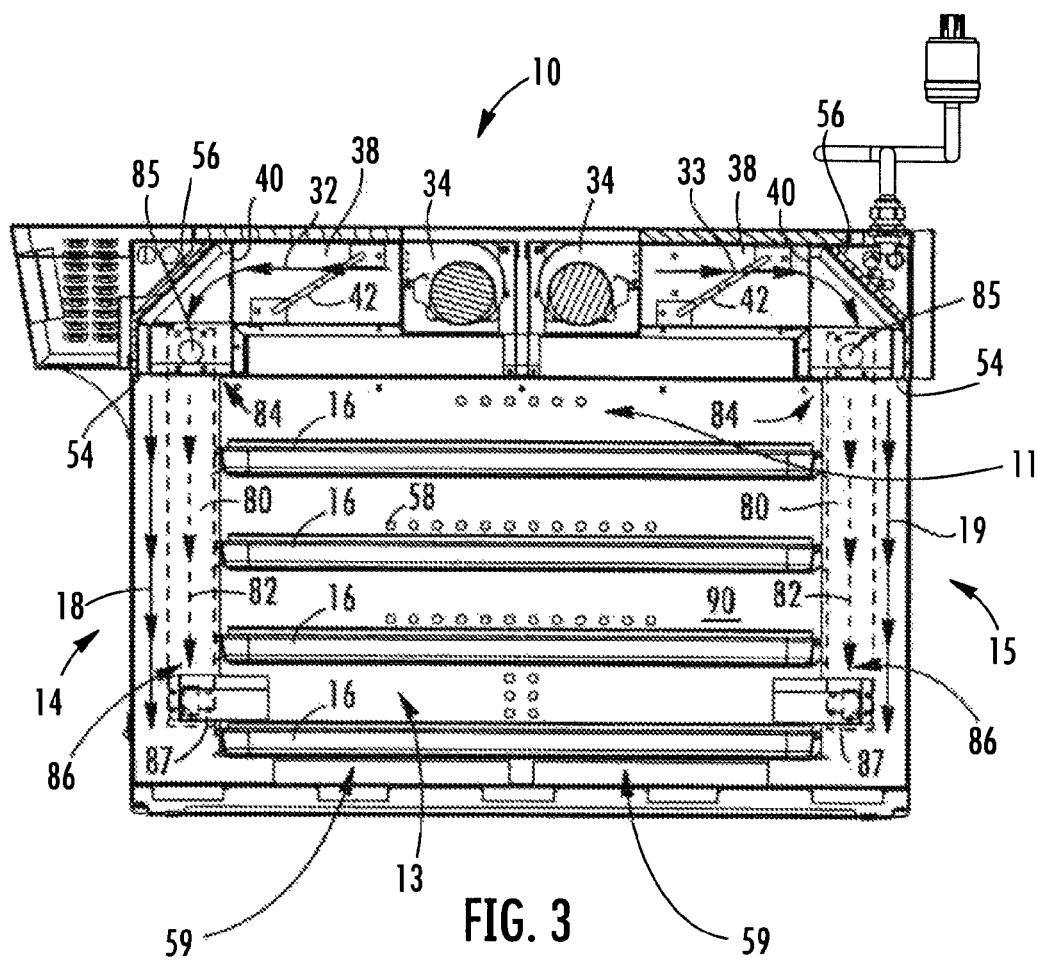
FIG. 3 is a sectional view of the container of FIG. 1 taken along line 3-3 of FIG. 1.
Figure 4:
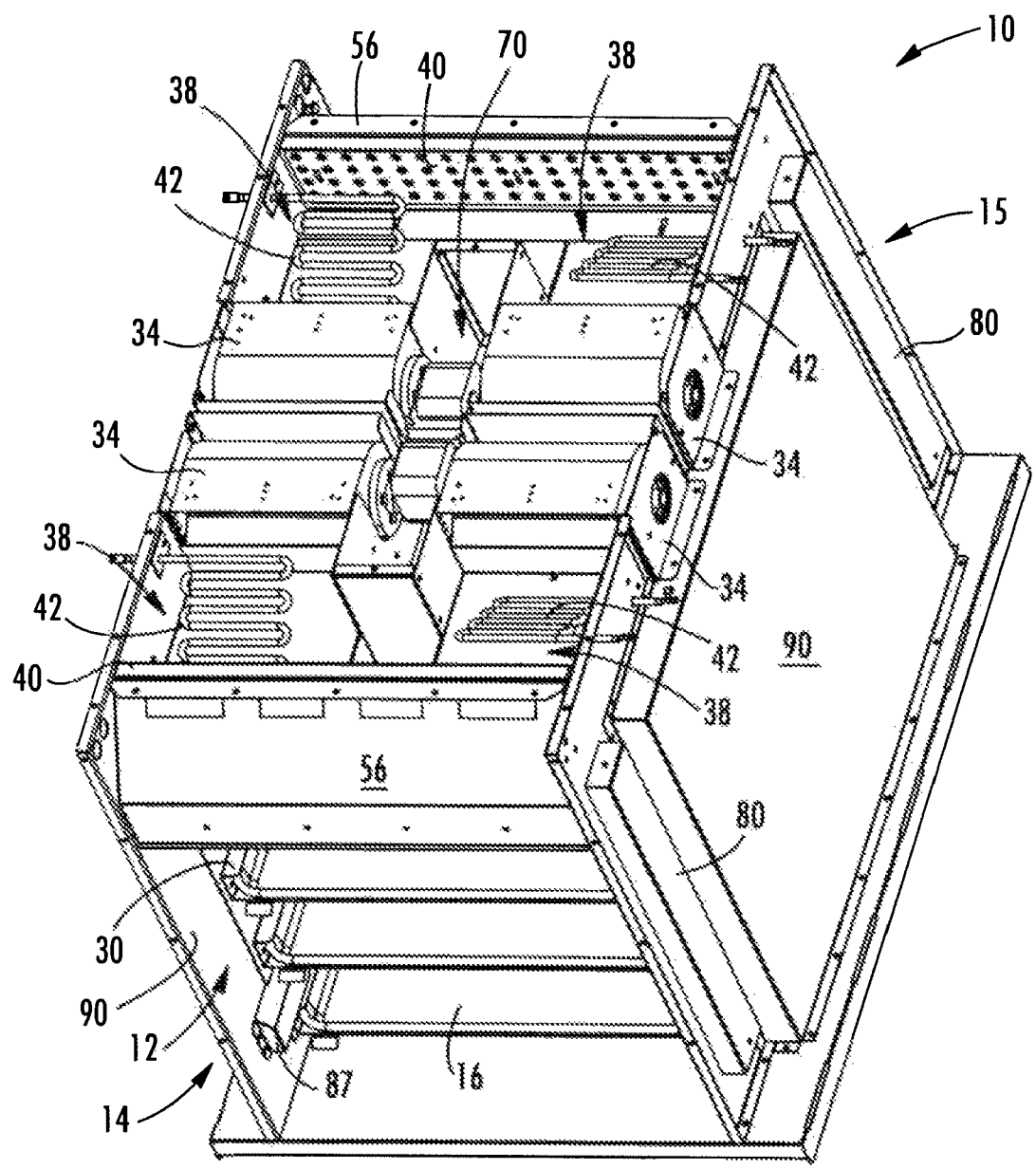
FIG. 4 is a perspective view of the container of FIG. 1 with the outside covers removed.

Referring to FIGS. 2, 3, and 4, container 10 includes a wall or sidewall that defines a first opening 14 and a second opening 15 through which food may be moved into and out of an interior chamber or cavity 12 of container 10. According to an exemplary embodiment, first opening 14 and second opening 15 are provided on opposite sides of container 10. However, openings 14 and 15 need not be positioned opposite each other; any number and positioning of openings are contemplated.

As mentioned above, openings 14 and 15 are configured to allow a user to move food between the interior chamber 12 and the exterior of container 10. In the exemplary embodiment shown, openings 14 and 15 are positioned on opposite sides of container 10 to allow the user to pass food into interior chamber 12 from either side of container 10. This may be desirable in situations where container 10 is positioned on a counter so that the food preparer can access it from one side and the food consumer can access it from the other side. The food preparer can easily replenish the stock of food in container 10 from one side while the food consumer simultaneously accesses the other side.

Openings 14 and 15 may be any suitable size and shape. In the embodiment shown, openings 14 and 15 are quadrilateral and substantially planar. Openings 14 and 15 may be positioned in a substantially vertical plane, as shown in FIGS. 1-2, or may be positioned in a number of other planes (e.g., a substantially horizontal plane for a container where openings 14 and 15 are on a top side or a plane at any degree of inclination between a horizontal plane and a vertical plane).

Referring to FIGS. 1 and 3, trays 16 are used to support food (e.g., pastries, brownies, hot dogs, etc.). Trays 16 are configured to pass through openings 14 and 15 and be received by rails 30 in interior chamber 12. In other embodiments, food may be positioned in container 10 in a variety of other suitable ways (e.g., individual food items placed in container 10 without using trays 16, etc.).

As shown best in FIGS. 3 and 4, container 10 uses air curtains 18 and 19 to form barriers between interior chamber 12 of container 10 and the exterior environment. Food placed in trays 16 may be positioned substantially between air curtains 18 and 19. A user can easily reach through, or otherwise pierce, air curtains 18 and 19 to move food between the interior chamber 12 and the exterior of container 10. Thus, air curtains 18 and 19 provide an effective barrier between interior chamber 12 and the exterior environment while eliminating the need for a user to open a door to move food into and out of container 10. Air curtains 18 and 19 may also provide an effective barrier against insects and other foreign matter that may otherwise enter interior chamber 12. In addition, a portion of the air from air curtains 18 and 19 may be used to humidify, cool, and/or heat the interior of container 10.

Referring to FIGS. 3 and 4, container 10 includes a duct system configured to permit the circulation of air through interior chamber 12 and to create air curtains 18 and 19 across openings 14 and 15. Air curtains 18 and 19 are formed over openings 14 and 15 using a portion of air streams 32 and 33, respectively. The duct system of container 10 includes a plurality of baffle boxes 38 shown in FIG. 3. Each baffle box 38 includes a baffle 40, a heater, shown as heating element 42 in FIG. 3, and a duct 56. At least one fan 34 is configured to supply air to the duct system. Referring specifically to FIG. 4, wiring enclosure 70 houses electrical wires that provide power to heating elements 42 as well as other electrical components.

In the exemplary embodiment shown, a fan 34 is adjacent each baffle box 38 at an interior or proximal end of each baffle box 38. Referring to FIG. 4, container 10 includes four baffle boxes 38 that are separated so that air is unable to travel between individual baffle boxes 38. However, in another embodiment, baffle boxes 38 may be combined into one baffle box.

Referring to FIG. 3, fans 34 operate in conjunction with the duct system to circulate air throughout container 10. In general, fans 34 are electrically operated and are configured to provide a constant air flow rate. In another embodiment, fans 34 may be adjustable to provide varying controlled (actively or passively) air flow rates. Shown in FIG. 2, fans 34 are provided with outside ventilation using louvers 50. Air that enters louvers 50 may be used to prevent fans 34 from overheating. In the embodiment shown, ambient air that enters louvers 50 is kept separate from air streams 32 and 33. In another embodiment, air streams 32 and 33 may comprise ambient air that is continually being combined with the air in the duct system. In another embodiment, air streams 32 and 33 may comprise only ambient air that is brought in through a vent then expelled back into the ambient environment after it has been used to create air curtains 18 and 19.

FIG. 3 illustrates the general flow of air streams 32 and 33 according to one exemplary embodiment. Fans 34 blow air into substantially enclosed baffle boxes 38. Air from fans 34 may be heated in baffle boxes 38 with heating elements 42. According to an exemplary embodiment, heating elements 42 are provided inside baffle boxes 38. According to other exemplary embodiments, heating elements 42 may be located in any suitable position such that air in the duct system is heated. Baffles 40 are provided on the side of baffle boxes 38 opposite of fans 34. After being heated, air streams 32 and 33 pass through baffles 40. Shown in FIGS. 4 and 5, baffles 40 are perforated, substantially planar, plates. Typically, the perforations in baffles 40 are also substantially uniform. As air streams 32 and 33 pass through the perforations in baffles 40, the velocity of air streams 32 and 33 increases briefly before slowing down on the other side of baffles 40. Baffles 40 further provide a pressure drop for air streams 32 and 33.

According to one exemplary embodiment, container 10 may include a water source (not shown). The water source may be configured to provide moisture that increases the humidity of the air in air streams 32, 33 and/or interior chamber 12. The water source may be configured as a tray proximate to each baffle 40. After passing through baffle 40, the air passes over the water source to humidify the air. As discussed above, a baffle 40 substantially decreases the velocity of air streams 32 and 33 and may also reduce the pressure of the air passing through it. The decrease in velocity and/or pressure drop of air streams 32 and 33 passing through a baffle 40 allows the humidity of the air in the duct system to increase more than if baffles 40 were not present. The water source may include a heating element to heat the water and to provide a controlled amount of water vapor to be picked up by the air. In other embodiments, container 10 may be configured without a water source or system for humidifying air streams 32 and 33. This may be desirable in connection with foods that do not need to be humidified.

Referring to FIGS. 3 and 4, after passing through baffles 40, air streams 32 and 33 travel through ducts 56, which are part of the duct system. As air streams 32 and 33 enter ducts 56, the velocity of air streams 32 and 33 increase due to the smaller area through which air streams 32 and 33 now pass. A portion of air streams 32 and 33 exits ducts 56 through nozzles 54. Nozzles 54 are positioned adjacent to an upper side of each opening 14 and 15 in a downward direction. In the embodiment shown in FIG. 3, nozzles 54 define the distal end of baffle boxes 38. As air streams 32 and 33 pass downward over openings 14 and 15 two barriers, shown as air curtains 18 and 19 are created.

As shown in FIGS. 3-6, the duct system further includes bypass ducts 80 located proximate to openings 14 and 15. In the exemplary embodiment shown, bypass ducts 80 run vertically along the sides of food container 10 substantially parallel to openings 14 and 15. Bypass ducts 80 are configured to divert a portion of air streams 32 and 33 from ducts 56, creating diverted air streams 82. Diverted air streams 82 include a portion of the heated and/or humidified air in the duct system. Diverted air streams 82 do not pass across openings 14 or 15; instead, bypass ducts 80 deliver the heated air of diverted air streams 82 directly to the lower portion 13 of interior chamber 12. In the exemplary embodiment shown, bypass ducts 80 are configured to deliver heated air to the interior chamber from locations substantially adjacent or proximate to openings 14 and 15.

In other embodiments, bypass ducts 80 need not be substantially adjacent to or run parallel to either opening 14 or 15. Bypass ducts 80 may be configured in any manner that allows heated air to be delivered directly to the lower portion 13 of interior chamber 12 or that allows at least one diverted air stream 82 to combine with the heated air from air curtains 18 and 19 at a portion of interior chamber or cavity 12 that is distinct from where air ducts 56 deliver air across openings 14 and 15. In addition, bypass ducts 80 need not divert air from ducts 56. In other embodiments, bypass ducts 80 may divert heated air from other parts of the duct system. While the exemplary embodiment of the container 10 shown in FIGS. 1-7 includes bypass ducts 80 located on both sides of openings 14 and 15, it should be understood that container 10 may have more or fewer bypass ducts 80. For example, container 10 may include bypass ducts 80 proximate to only one of openings 14 and 15 or may include only a single duct proximate to each of openings 14 and 15. In addition, bypass ducts 80 need not terminate proximate to either opening 14 or 15.

In taller heated food containers, the portions of air streams 32 and 33 that form air curtains 18 and 19, respectively, may be substantially cooler near the bottom of openings 14 and 15 than they are proximate to nozzles 54. This cooling in turn may lead to a lack of temperature and/or humidity uniformity throughout interior chamber 12. In the exemplary embodiment shown, diverted air streams 82 facilitate the maintenance of a substantially uniform temperature and/or humidity throughout interior chamber 12.

Figure 5:
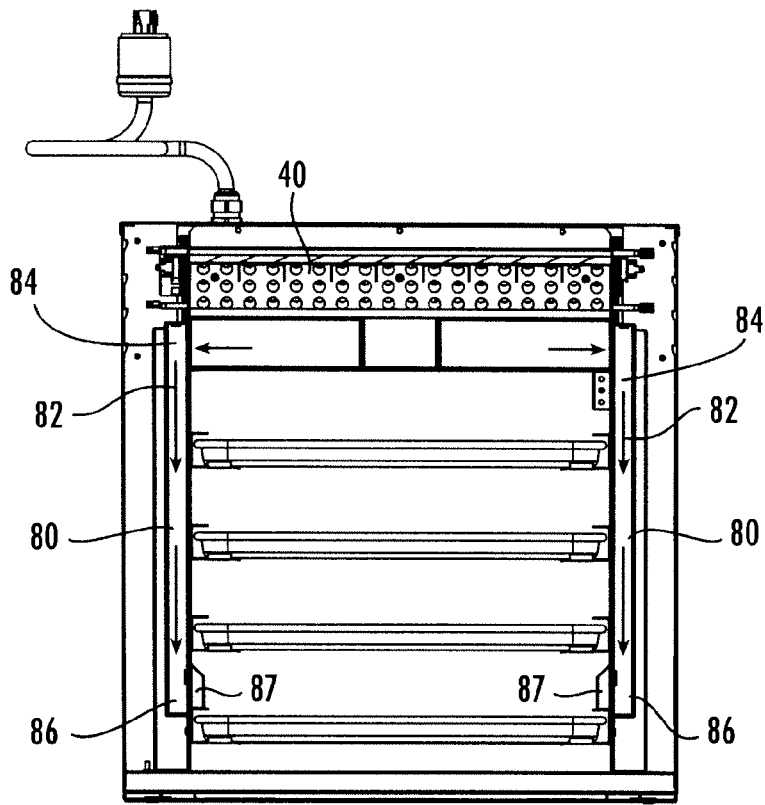
FIG. 5 is a sectional view of the container of FIG. 1 taken along line 5-5 of FIG. 2.

Referring to FIGS. 3 and 5, each of the bypass ducts 80 includes a first or proximal end 84 in fluid communication with duct 56 and a second or distal end 86 in fluid communication with interior chamber 12. Proximal ends 84 include openings or inlets 85 that allow a portion of air streams 32 and 33 to be diverted into bypass ducts 80. Distal ends 86 may include outlets or nozzles 87 that are in fluid communication with bypass ducts 80 and that allow diverted air streams 82 to pass into interior chamber 12. As shown best in FIG. 3, nozzles 87 are located near the lower portion 13 of interior chamber 12 and are positioned to direct diverted air streams 82 into interior chamber 12 without being directed across openings 14 and 15 respectively.

Diverted air streams 82 maintain a generally constant temperature and/or humidity as they travel from the proximal end 84 to the distal end 86 of bypass ducts 80. In effect, bypass ducts 80 allow portions of air streams 32 and 33 to be delivered to interior chamber 12 at substantially the same temperature and/or humidity as the air in ducts 56. This configuration allows the interior chamber 12 to be maintained at a substantially uniform temperature and/or humidity. In the embodiment shown, the air from air streams 32, 33 and diverted air streams 82 is used to maintain the temperature and/or humidity of chamber 12 substantially constant without the use of additional temperature and/or humidity control systems.

The temperature variations of interior chamber 12 that will be acceptable to a user of container 10 will likely depend on the type of food placed within interior chamber 12. For example, great temperature uniformity may be needed when the food in container 10 is particularly susceptible to spoilage. In these applications, interior chamber 12 is at a substantially uniform temperature if the temperature variation in interior chamber 12 is less than 1° F. In the exemplary embodiment shown, interior chamber 12 is at a substantially uniform temperature if the temperature variation in interior chamber 12 is less than 5° F. (e.g., maintaining the lower portion 13 of the interior chamber 12 at 165° F. and the upper portion 11 of the interior chamber 12 at 170° F.). In another embodiment, the lower portion 13 of the interior chamber 12 is maintained within 10° F. of the upper portion 11 of the interior chamber 12. However, a wide variety of temperature ranges may be desirable, depending on the application.

Figure 7:
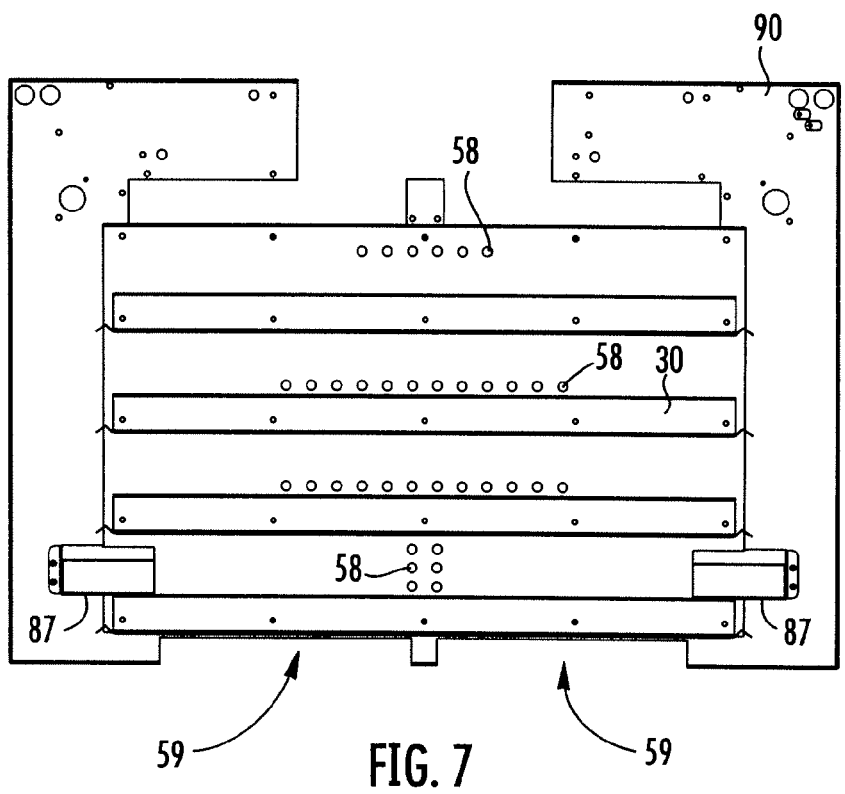
FIG. 7 is a side elevation view of the interior surface of a side panel of the container of FIG. 1.
Figure 6:
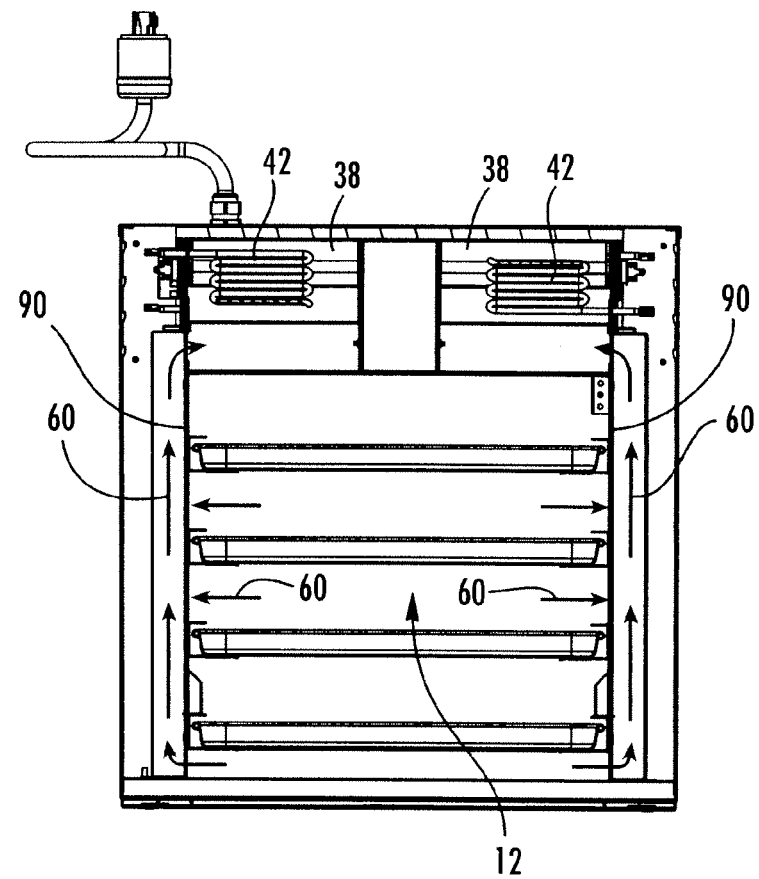
FIG. 6 is a sectional view of the container of FIG. 1 taken along line 6-6 of FIG. 2.

Referring to FIGS. 3 and 7, the duct system may further comprise a plurality of air returns 58 and a set of lower air return ducts 59. Air returns 58 may be positioned along the inner surface of interior chamber 12, and lower air return ducts 59 may be positioned below interior chamber 12. In the exemplary embodiment shown in FIGS. 3 and 7, sidewalls 90 (only one sidewall is shown in FIGS. 3 and 7; a second sidewall is positioned on the opposite side of container 10 as shown in FIG. 6) define a portion of the inner surface of interior chamber 12. As shown best in FIGS. 4 and 6, sidewalls 90 are generally hollow members. Air returns 58 and lower air return ducts 59 are configured to allow air to flow from interior chamber 12 into hollow sidewalls 90.

According to the embodiment shown in FIGS. 3 and 6, air from air streams 32, 33, and diverted air streams 82 may be returned back to fans 34 through air returns 58 and lower air return ducts 59. In the exemplary embodiment shown, air from air streams 32, 33, and diverted air streams 82 may enter interior chamber 12. Next, the air passes from interior chamber 12 into the hollow sidewalls 90 as return air streams 60. Return air streams 60 are graphically represented by the series of arrows shown in FIG. 6. As mentioned above, return air streams 60 pass into sidewalls 90 via air returns 58 and lower air return ducts 59. Once within sidewalls 90, return air streams 60 travel through sidewalls 90 and exit through openings provided on the top of sidewalls 90 proximate to fans 34.

In the exemplary embodiment shown in FIG. 7, a portion of the air returns 58 on sidewalls 90 are provided proximate to rails 30 in generally horizontal groups. When trays 16 containing food are placed on rails 30, the food on trays 16 is generally aligned with air returns 58. With this arrangement, heated and/or humidified air from air streams 32, 33, and diverted air streams 82 passes over and/or around or generally adjacent to the food before it flows into air returns 58. This arrangement allows for the effective distribution and transfer of heat and/or moisture to food within interior chamber 12.

While the illustrated embodiment includes two air curtains 18 and 19 across two opposite openings 14 and 15, other configurations are possible. According to another exemplary embodiment, container 10 may include a single opening and a single air curtain. The wall opposite the opening (e.g., the back wall) may be similar to the sidewalls and may include additional air returns. If the container includes a single opening, the duct system, fans 34, baffle boxes 38, etc. may be arranged differently. For example, fans and heating elements may located proximate to the back wall. According to still other exemplary embodiments, the duct system, fans 34, baffle boxes 38, etc. may be located near the bottom of the food container and may create one or more air curtains formed by an upwardly moving air stream. A single opening food container and other related embodiments are taught in U.S. Pat. No. 7,220,946 and U.S. Patent Publication No. 2005/0211109, both of which are incorporated herein by reference.

For purposes of this disclosure, the term "coupled" means the joining of two components (electrical or mechanical) directly or indirectly to one another. Such joining may be stationary in nature or movable in nature. Such joining may be achieved with the two members (electrical or mechanical) and any additional intermediate members being integrally formed as a single unitary body with one another or with the two members or the two members and any additional member being attached to one another. Such joining may be permanent in nature or alternatively may be removable or releasable in nature.

The construction and arrangement of the elements of the heated food container shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials in any of a wide variety of colors, textures and combinations. Other substitutions, modifications, changes and omissions may be made in the design, operating conditions and arrangement of the exemplary embodiments.

What is claimed is:

1. A heated food container, comprising:
    an interior chamber having an upper portion and a lower portion;
    a wall defining an opening into the interior chamber, wherein the opening is configured to permit the movement of food into and out of the interior chamber;
    a fan configured to supply air to a duct system; and
    a heater configured to heat the air in the duct system;
    the duct system comprising:
        a first air duct configured to direct the heated air from the upper portion across the opening such that the heated air forms a barrier between the interior chamber and an exterior environment; and
        a first bypass duct configured to deliver heated air from the upper portion to the lower portion of the interior chamber without being directed across the opening; wherein the first bypass duct is configured to deliver heated air to the interior chamber from a location substantially adjacent the opening.

2. The heated food container of claim 1, wherein the first bypass duct is configured to maintain the interior chamber at a substantially uniform temperature.

3. The heated food container of claim 1, wherein the first bypass duct is configured to maintain the temperature of the lower portion of the interior chamber within 5° F. of the temperature of the upper portion of the interior chamber.

4. The heated food container of claim 1, the first air duct further comprising a distal end and a proximal end, wherein the fan is located at the proximal end of the first air duct and the distal end of the first air duct is positioned at an upper side of the opening into the interior chamber.

5. The heated food container of claim 4, the first bypass duct further comprising a distal end and a proximal end, wherein the distal end of the first bypass duct is positioned on the lower portion of the interior chamber and the proximal end of the first bypass duct diverts a portion of the heated air from the first air duct.

6. The heated food container of claim 1, the duct system further comprising a second bypass duct configured to deliver a portion of the heated air to the lower portion of the interior chamber.

7. The heated food container of claim 6, further comprising:
a first nozzle located on the lower portion of the interior chamber wherein the first nozzle is in fluid communication with the first bypass duct and is configured to direct heated air into the interior chamber; and
a second nozzle located on the lower portion of the interior chamber wherein the second nozzle is in fluid communication with the second bypass duct and is configured to direct heated air into the interior chamber.

8. The heated food container of claim 1, the duct system further comprising a plurality of air returns in an inner surface of the interior chamber, the plurality of air returns configured so that air moves from the barrier to the air returns passing adjacent to the food.

9. The heated food container of claim 8, further comprising a food shelf positioned in the interior chamber, wherein the air returns are positioned adjacent to the food shelf.

10. The heated food container of claim 1, wherein the first bypass duct delivers heated air only to the lower portion of the interior chamber.

11. A heated food container, comprising:
a chamber having a sidewall defining an interior cavity of the chamber, the interior cavity having a first portion and a second portion opposite to the first portion;
an opening in the sidewall of the chamber;
a first air duct configured to deliver heated air across the opening from the first portion; and
a first bypass duct configured to deliver heated air from the first portion to the second portion of the interior cavity; wherein the first bypass duct is configured to deliver heated air to the interior cavity from a location substantially adjacent the opening.

12. The heated food container of claim 11, wherein the first bypass duct is configured to maintain the interior cavity at a substantially uniform temperature.

13. The heated food container of claim 11, wherein the first bypass duct is configured to divert heated air from the first air duct.

14. The heated food container of claim 11, further comprising a second bypass duct configured to deliver heated air to the interior cavity, wherein the heated air delivered by the second bypass duct combines with the heated air delivered by the first air duct away from the location where the first air duct delivers heated air across the opening.

15. The heated food container of claim 14, wherein the second bypass duct is configured to deliver heated air to the interior cavity from a location substantially adjacent the opening.

16. The heated food container of claim 15, further comprising at least one nozzle in fluid communication with at least one of the first bypass duct and the second bypass duct wherein the nozzle is configured to direct heated air into the interior cavity.

17. The heated food container of claim 11, wherein the first portion is an upper portion and the second portion is a lower portion of the interior cavity.

18. A heated food container, comprising:
an interior chamber having an upper portion and a lower portion;
a first wall defining a first opening into the interior chamber, wherein the first opening is configured to permit the movement of food into and out of the interior chamber;
a second wall defining a second opening into the interior chamber, wherein the second opening is configured to permit the movement of food into and/or out of the interior chamber;
a fan configured to supply air to a duct system; and
a heater configured to heat the air in the duct system;
the duct system comprising:
a first air duct configured to direct the heated air from the upper portion across the first opening to form a first barrier between the interior chamber and an exterior environment;
a second air duct configured to direct the heated air from the upper portion across the second opening to form a second barrier between the interior chamber and the exterior environment; and
a first bypass duct configured to deliver heated air from the upper portion to the lower portion of the interior chamber; wherein the first bypass duct includes only a single outlet located in the lower portion of the interior chamber substantially adjacent the first opening.

19. The heated food container of claim 18, the duct system further comprising a second bypass duct configured to deliver heated air directly to the lower portion of the interior chamber without being directed across either the first or the second opening.

20. The heated food container of claim 19, wherein the first bypass duct and the second bypass duct are configured to maintain the interior chamber at a substantially uniform temperature.

21. The heated food container of claim 19, wherein the first bypass duct and the second bypass duct are configured to maintain the temperature of the lower portion of the interior chamber within 5° F. of the temperature of the upper portion of the interior chamber.

22. The heated food container of claim 19, wherein the first bypass duct is configured to deliver heated air to the interior chamber from a location proximate the first opening and the second bypass duct is configured to deliver heated air to the interior chamber from a location proximate the second opening.

23. The heated food container of claim 18, the duct system further comprising a plurality of air returns in an inner surface of the interior chamber, the plurality of air returns configured to permit the flow of the heated air from the barriers of the first and second openings to the air returns passing adjacent to the food.

24. The heated food container of claim 23, further comprising a food shelf positioned in the interior chamber, wherein the air returns are positioned adjacent to the food shelf.

25. The heated food container of claim 18, wherein the single outlet of the first bypass duct directs heated air in a direction perpendicular to the heated air directed by first air duct.

* * * * *